Aug. 18, 1964  H. W. LINGER  3,144,895
HIGH TEMPERATURE DEFORMED THREAD LOCK NUT WITH PERFORATED BODY
Filed Feb. 25, 1959
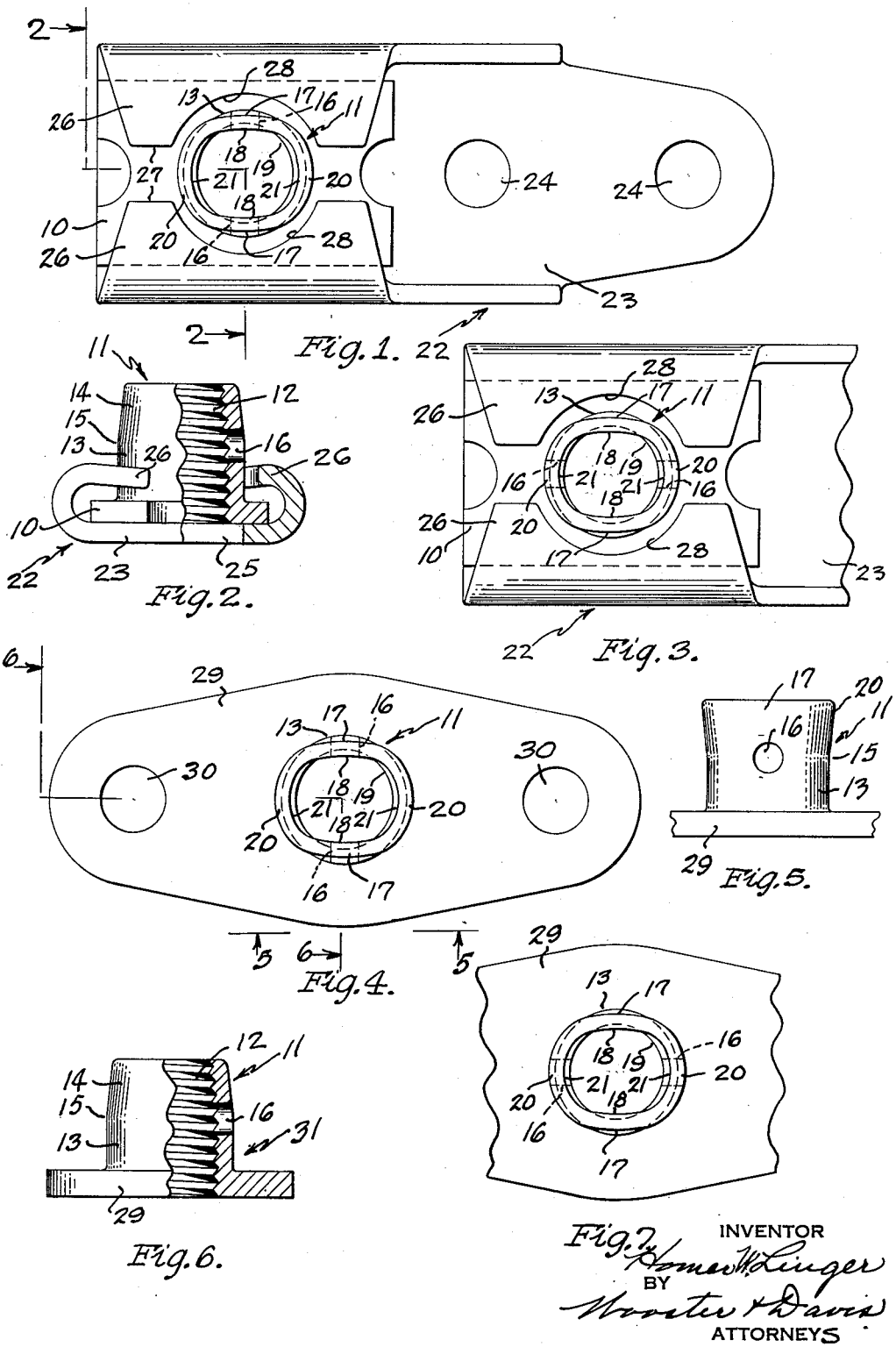

United States Patent Office 3,144,895
Patented Aug. 18, 1964

3,144,895
HIGH TEMPERATURE DEFORMED THREAD
LOCK NUT WITH PERFORATED BODY
Homer W. Linger, New Canaan, Conn., assignor, by mesne assignments, to Textron Industries, Inc., Norwalk, Conn., a corporation of Delaware
Filed Feb. 25, 1959, Ser. No. 795,413
1 Claim. (Cl. 151—21)

This invention relates to lock nuts, and has for an object to provide an improved and simple construction of a nut provided with more effective means for self-locking effect on the threads of the bolt or screw threaded into the nut, and one which is adapted to secure the improved locking effects when used at high temperatures.

Another object is to provide such a construction of self-locking nut which, although it is very effective when constructed of materials which are not subject to heat treatment and therefore where dependence is placed on the natural resiliency of the material to provide a re-usable self-locking nut, it is still well adapted for fabrication from heat treatable materials to increase its resiliency and the number of times which it may be removed from and re-applied to the bolt without losing its resiliency and its self-locking effect.

Another object is to provide an improved self-locking nut adapted for use in high temperature applications, and which is so constructed that the self-locking effect is increased and improved by the higher temperatures to which the nut and the bolt on which it is used are subjected.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

FIG. 1 is a top plan view of this improved nut showing it as applied in the form of a floating nut in a mounting base support;

FIG. 2 is a partial transverse section and partial end view of the device of FIG. 1 taken substantially on line 2—2 of FIG. 1;

FIG. 3 is a plan view of a portion of the device of FIG. 1 showing a slight modification;

FIG. 4 is a top plan view of the nut involving this invention formed with a different type of base flange;

FIG. 5 is a partial side view thereof taken substantially on line 5—5 of FIG. 4;

FIG. 6 is a partial longitudinal section and partial end view of the nut of FIG. 4 taken substantially on line 6—6 of FIG. 4; and FIG. 7 is a top plan view of the barrel of the nut and a portion of the flange similar to that of FIG. 4 but showing a slight modification.

In all of the figures of the drawing the nut is shown on a greatly enlarged scale, and therefore the various features of the nut are exaggerated for more clear and complete understanding of the structure and operative features of the nut.

Referring first to FIGS. 1, 2 and 3, the nut is shown as comprising a base flange 10 and an integral tubular barrel 11 projecting upwardly from this flange screw threaded on its interior surface as indicated at 12, for screw threaded engagement with the corresponding threads of a screw or bolt threaded or screwed into the nut. This barrel is of substantially circular or cylindrical shape in cross section for substantially the lower half thereof, as indicated at 13, and substantially the upper half 14 is deformed to a substantially oval or elliptical shape, as shown more clearly in FIGS. 1 and 3, the deforming increasing progressively from about the mid height 15 of the barrel to its upper or free end, as indicated more clearly in FIG. 2.

This barrel is provided with one or more circular locking openings 16 extending through its side wall, preferably located on one of the axes of the deformed oval shape and at substantially the mid height of the barrel at the junction 15 between the undeformed and deformed portions so as to extend partially into each one of these portions. The holes are preferably located with their centers substantially at the junction between the deformed and undeformed portions, and are located on the major or minor axis of the oval, depending on the type of material of which the nut is fabricated and the effects desired in the use of the nut. The deformation of the upper portion is effected by pressing inwardly opposite sides of the nut indicated at 17, which causes the free edges 18 of the threads on these portions to move somewhat inwardly of the free edges 19 of the threads of the lower undeformed portion 13, and causes the intermediate portions 20 connecting these inwardly pressed portions to move outward somewhat and carry the inner edges 21 of the threads on these portions slightly outwardly of the free edges 19 of the threads on the undeformed portion, as shown in FIGS. 1 and 3.

In the form of the device of FIGS. 1 and 2, the circular openings 16 are on the minor axis of the oval, and therefore their upper portions are on the inwardly depressed sides of the oval.

In the form of FIG. 3 these circular openings are located on the major axis of the oval, and therefore their upper portions are in the connecting portions 20 of the oval and are moved slightly outwardly of the undeformed portions, but in both forms they provide a locking means with the threads of a screw or bolt screwed into the nut, together with the clamping and locking effect of the pressure or clamping of the inwardly deformed sides of the oval pressing against and gripping the threads of the bolt caused by the bolt forcing these inwardly depressed sides outwardly against the resilient action of the material of the nut as the bolt is screwed into the nut.

As previously indicated, this nut, as shown in FIGS. 1, 2 and 3, is shown as of the floating type mounted in a channel base member or support 22. This support comprises a substantially flat base 23 provided with suitable openings 24 for rivets or other means by which in use it may be secured to a supporting member and with an opening 25 over which the nut is mounted. These side flanges 26 of the member 22 are bent upwardly and over the flange 10 of the nut to cooperate therewith to retain the nut in the channel member 22, these flanges being long enough so that their free edges 27 extend to opposite sides of the barrel of the nut, and are provided with concave recesses 28 of larger diameter than the barrel and located on opposite sides thereof to hold the nut to permit limited longitudinal and lateral movements of the nut in the supporting member 22, but retain it in position on this member.

In the form of the nut shown in FIGS. 4 to 7 it comprises a base flange 29 of any suitable shape, that shown being of an oblong shape provided with openings 30 by which the nut may be riveted or otherwise secured to a member with which the nut is being used, and extending upwardly from this flange is the integral threaded barrel 31. This barrel is of the same shape and construction as the barrel of FIGS. 1, 2 and 3, and therefore the same reference characters are used to indicate the various features of this barrel.

This improved nut may be formed of various materials including metals not subject to heat treatment and therefore employing the natural resiliency and other characteristics of the material for securing the self-locking effect of the combination of the inwardly pressed sides of the deformed portion of the barrel with the round holes through the side walls of the barrel at the junction of this deformed portion and the undeformed lower or load portion of the barrel. It is also adapted for fabrication from heat treatable metals to secure the improved resiliency and improved locking effects as well as greater capability of withstanding removals from and applications to the threaded bolt secured by such, without losing its locking effect. It is well adapted for fabrication from metals which are capable of withstanding high temperatures in use, such, for example, as applications involving jet engines, and in these applications as the threads of the bolt are exposed in the openings they expand under the higher temperatures to cause these threads to expand into the openings 16 so that the inner side edges of these openings have a greater gripping effect on the threads and add to the locking action, and when cooling the threads contract to their normal dimension, permitting easier removal from the bolt.

In fabricating the nut it may be formed by blanking from sheet metal of a suitable gauge to form the flange and then piercing and drawing the barrel from this blank, or it could be formed from bar material by machining, or it could be formed by forging or cold heading. The preferred form, however, is to blank the flange from sheet metal and draw the tubular barrel from this blank. The upper or free end portion of the barrel is deformed out of round after drilling the holes 16 and after threading the interior of the barrel. Also the threading is done after the drilling operation, as this eliminates the possibility of burrs at the inner edges of the holes, which would interfere with threading onto a bolt, for example, or cause injury to the threads of the bolt. Also, the use of the round holes eliminates corners which might form focal points from which cracks would emanate under stress and also under vibration in use of the nut. These round holes have no corners for stress concentration for fatigue failure under vibrations. Also locating these holes at the junction between the deformed locking portion and the undeformed load portion to a certain extent separates the locking section from the undeformed load section of the barrel and prevents the deformed section from progressing into the load section, which it is necessary to maintain in its undeformed condition. The holes provide relief at the junction of the deformed and undeformed portions and provide relief for the ellipse which tends to normalize the upper locking section into the out-of-round condition, thereby increasing re-usability. The inherent rigidity of the metal used in forming the nut determines the axis of the deformed body portion in which the holes will be located. With the less rigid, softer, and inherently more resilient and yieldable material the holes are located on the major axis of the barrel, as indicated in FIGS. 3 and 7. This locates these holes in the more rigid portion of the deformed parts of the wall. With the inherently more rigid material the holes are drilled in the side walls on the minor axis of the oval, with the connecting portions 20 forming a more rigid undrilled portion of the walls. The combined locking effect of the deformed pressed-in side portions and the round holes is particularly effective with certain materials called the super alloys, such, for example, as high nickel and high cobalt alloys. The proper diameters for the holes 16 vary under different conditions, such, for example, as size of barrel, temperatures and materials involved, but for most applications it is found best results are secured with a hole diameter of approximately three pitches of the screw thread in the barrel.

Having thus set forth the nature of my invention, I claim:

A light weight self-locking nut for use at high temperatures comprising a unitary thin-walled body made of a super alloy and including: a flange-like base; an internally threaded tubular barrel extending upwardly from said base; the cross-section of substantially the upper half portion of said barrel being of oval shape and of the lower half portion of said barrel being of circular shape, whereby said upper portion is a self-locking means for the nut when a threaded member is inserted into said barrel; and a pair of aligned circular openings formed in and extending through said barrel on the major axis of the oval at the junction of said barrel portions, said openings being of a diameter at least as large as the axial distance between one pitch of the threads on said barrel.

References Cited in the file of this patent

UNITED STATES PATENTS

| | | |
|---|---|---|
| 550,898 | Richardson | Dec. 3, 1895 |
| 1,529,161 | Britton | Mar. 10, 1925 |
| 2,255,286 | Harvey | Sept. 9, 1941 |
| 2,286,981 | Todd | June 16, 1942 |
| 2,287,691 | Marchou | June 23, 1942 |
| 2,385,991 | Huntoon | Oct. 2, 1945 |
| 2,653,641 | Wellman | Sept. 29, 1953 |
| 2,720,905 | Bessom | Oct. 18, 1955 |
| 2,816,591 | Reiner | Dec. 17, 1957 |
| 2,846,701 | Bedford | Aug. 12, 1958 |

FOREIGN PATENTS

| | | |
|---|---|---|
| 78,411 | Sweden | Sept. 19, 1933 |